(Model.)
A. MacLAINE.
PISTON FOR STEAM AND OTHER ENGINES.
No. 288,082. Patented Nov. 6, 1883.
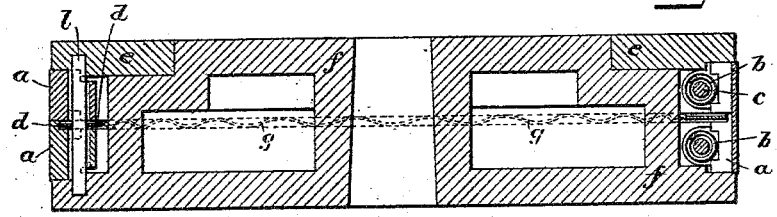
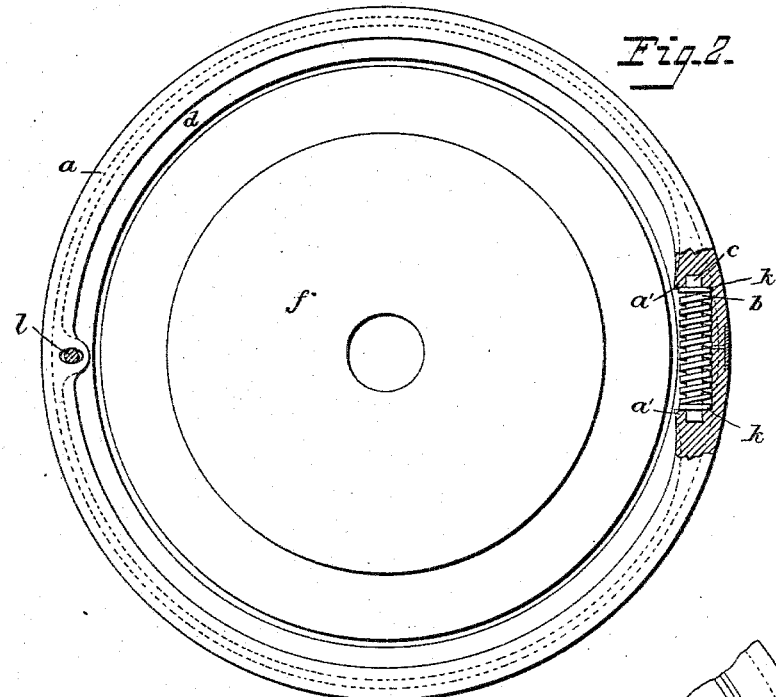
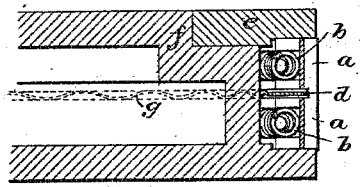
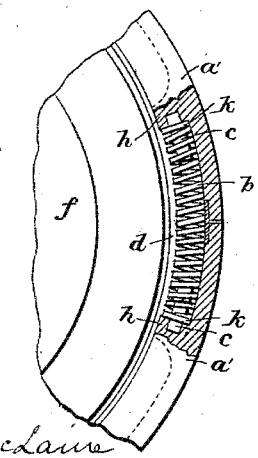
Attest:
Cont. A. Cope
H. E. Hansmann
Inventor:
Alex. MacLaine
By Charles E. Foster
Atty.

UNITED STATES PATENT OFFICE.

ALEXANDER MacLAINE, OF BELFAST, IRELAND.

PISTON FOR STEAM AND OTHER ENGINES.

SPECIFICATION forming part of Letters Patent No. 288,082, dated November 6, 1883.

Application filed April 23, 1883. (Model.) Patented in England January 25, 1883, No. 408; in France February 24, 1883, No. 153,918; in Germany April 16, 1883, and in Belgium August 16, 1883, No. 62,173.

*To all whom it may concern:*

Be it known that I, ALEXANDER MACLAINE, of Belfast, Ireland, in the Kingdom of Great Britain, have invented Improvements in Steam and other Pistons, of which the annexed is the specification.

The object of my invention is to provide steam and other pistons with durable and efficient elastic metallic packings, to secure a double expansion movement of the packing-rings. For this purpose I fit the piston with two or more metal rings cut through in one or more places, and with a spring or springs, preferably corrugated or waved, inserted between the rings, so as to maintain an efficient pressure and hold the rings tightly in the piston in the longitudinal direction of the cylinder, in combination with which arrangement I affix a coil or other spring or springs at or near the ends of the rings where cut, so as to press the ends apart and expand the rings circumferentially against the inner surface of the cylinder.

In the drawings, Figure 1 illustrates in sectional elevation a steam-piston, in which $a$ $a$ are the rings. $b$ $b$ are straight coil-springs. $c$ $c$ are bars or tubes passing up or through the inside of the coil-springs. $d$ is the circular wave or corrugated spring fixed between the rings and lying in an annular recess formed by cutting away one or both rings, as shown, and made by preference in one piece and cut through transversely in one place. $e$ is the junk-ring. $f$ is the body of the piston. $g$ $g$ $g$ are the waves or corrugations of the circular-wave springs, by preference compressed by the screwing down of the junk-ring, so as to develop the power necessary to hold the rings $a$ $a$ tightly against the junk-ring $e$ and the body of the piston $f$. $l$ $l$ are pins inserted into the junk-ring and body of the piston, respectively, and projecting into ovaled slots or holes in the rings $a$ $a$, to permit the rings to expand and prevent them moving round in the piston, and by preference the pin of one ring is placed opposite the cut in that ring and beside or near to the cut in the adjoining ring, so as to equalize the friction on the cylinder.

Fig. 2 is a plan of a steam-piston shown in Fig. 1, with junk-ring removed, showing one of the rings $a$ cut through transversely in one place, with a straight coil-spring affixed at or near to the ends of the ring where cut through, so as to press the ends apart and expand the ring circumferentially against the inner surface of the cylinder. $b$ is a straight coil-spring. $c$ is a loose bar or tube, which goes through the inside of the coil-spring and is inserted into recesses in the ring $a$. $k$ $k$ are steel washers, against which the ends of the spring bear, which washers are made of different thicknesses, to determine the force of the spring in pressing apart the ends $a'$ $a'$ of the ring and in expanding it circumferentially against the inner surface of the cylinder after the ring and spring have been compressed into the cylinder. $l$ is the pin, which prevents the ring moving round in the piston, and which projects into an ovaled slot or hole in the ring.

Fig. 3 is a sectional elevation of part of a piston fitted with curved springs, in which $a$ $a$ are the rings. $b$ $b$ are curved coil-springs. $d$ is the wave spring. $e$ is the junk-ring. $f$ is the body of the piston, and $g$ $g$ $g$ are the waves or corrugations of the wave spring.

Fig. 4 is a plan of the piston with the junk-ring removed, showing the arrangement of a curved spring at the ends of the ring where cut through, which presses the ends apart and expands the ring circumferentially against the inner surface of the cylinder. $a'$ $a'$ are portions of the ring on each side of the cut. $b$ is the curved coil-spring, which is made by preference to press firmly against the ends $a'$ $a'$ of the ring. $c$ $c$ are studs projecting into the inside of the ends of the curved coil-spring, and which studs are cast or firmly fastened into the lugs or projections $h$ $h$, formed or fixed on the ring. $k$ $k$ are steel washers inserted between the spring and the lugs or projections to receive the thrust of the spring, and which are made by preference of such thickness as to properly adjust the force of the spring in pressing apart the ends $a'$ $a'$ of the ring where cut through and expanding the ring circumferentially against the inner surface of the cylinder after the ring and spring have been compressed into the cylinder; and by preference the cut in the rings is tightened with the usual metallic tongue-piece, fitted either on the outside or the inside of the rings, and by preference the curved spring is made to extend a greater distance round from the cut than the straight spring, and may be fitted, if desired, with a bar or tube, similarly to the straight spring.

It will be apparent that other forms of spring may be substituted for the wave spring described. By this construction it will be seen that I make a durable and elastic packing, having a double expansion movement, and at the same time occupying but comparatively little space in the cylinder.

I do not claim, broadly, the use of a waved-ring spring for spreading the split rings of pistons.

I claim—

1. The combination, with a piston, of two or more metallic rings cut through transversely in one or more places, with an annular recess between, and a spring or springs inserted between the rings to press them tightly in the piston in the direction of the longitudinal axis of the cylinder, and a coil or other spring or springs inserted between the ends of the rings where cut through, so as to press the ends apart and expand the rings circumferentially against the inner surface of the cylinder, substantially as described.

2. A coil-spring with a bar or tube through it, arranged as described, in combination with a split packing-ring and the spring $d$, substantially as described.

3. The combination of the packing-rings, a spring arranged to spread the ends, and a wave spring arranged between the rings, substantially as set forth.

In testimony whereof I have signed my name to this specification in the presence of two subscribing witnesses.

ALEXANDER MacLAINE.

Witnesses:
 HUGH HYNDMAN,
 SAML. P. BROWN.